(12) United States Patent
Wang

(10) Patent No.: US 6,608,624 B1
(45) Date of Patent: Aug. 19, 2003

(54) METHOD FOR ACCELERATING 3D ANIMATION PRODUCTION

(75) Inventor: Chuan-Hong Wang, Taipei (TW)

(73) Assignee: Image Tech Incorporation (TW)

( * ) Notice: Subject to any disclaimer, the term of this patent is extended or adjusted under 35 U.S.C. 154(b) by 150 days.

(21) Appl. No.: 09/655,956

(22) Filed: Sep. 6, 2000

(51) Int. Cl.$^7$ .............................................. G06T 13/00
(52) U.S. Cl. ..................................................... 345/473
(58) Field of Search ................................ 345/473, 522, 345/646; 703/13

(56) References Cited

U.S. PATENT DOCUMENTS

| | | | |
|---|---|---|---|
| 5,745,738 A | * | 4/1998 | Ricard .......................... 703/13 |
| 6,369,821 B2 | * | 4/2002 | Merrill et al. ............... 345/473 |
| 6,421,058 B2 | * | 7/2002 | Parikh et al. ................ 345/522 |

* cited by examiner

*Primary Examiner*—Mark Zimmerman
*Assistant Examiner*—Huedung X. Cao

(57) ABSTRACT

A method for accelerating 3D animation production, the method comprising: inputting a text string command; analyzing grammar of the text string command to find out the subject, the verb and the object or the quantity and object, through a main program. Then, the main program deliveries order to a subprogram which controlling the subject, to execute judgment and treatment of the action and behavior of the subject. After that, the subprogram finds out the default parameters relating to the relative coordinate and relationship between the subject and object, the current state of the subject, the actions and behaviors to be executed by the subject as well as environmental factors and personality of the subject. Finally, the subprogram judges and integrates those default parameters to control the subject executing appropriate actions or behaviors in response to the text string command.

20 Claims, 4 Drawing Sheets

METHOD FOR ACCELERATING 3D ANIMATION PRODUCTION

BACKGROUND OF THE INVENTION

1. Field of the Invention

The present invention relates to a method for 3D animation production, and more particularly to a method for accelerating 3D animation production executing by computer programs.

2. Description of the Prior Art

For the conventional 2D animation, a lot of sequential pictures are drawn by hand, and played continuously by high speed, e.g. above 24 pictures per second, then resulting in the residue image effect due to the persistence of vision, which is the basic principal of the animation.

The method for producing the conventional animation seen in the television or other mediums is that after a script is finished, the director and drawer draw out all of views. In the case of the animation of "the Egypt Prince", it takes ten months to draw thousands of pictures for all of views. After the views of animation are completed, the animators produce a sequence of animations according to the views. In general, the animators are divided into two groups, one is a group for key drawings, and the other is a group for in between drawings when executing draft drawings for each sequence of animation. The group for key drawings generates action drawings of key drawings, while the group for in between drawings generates sequential action drawings for in between drawings. For example, the animator plans to draw an action for sitting on a chair, firstly, the group for key drawings draws decomposed actions for sitting on a chair for a character, such as walk, stop, bow and sit down etc. Those actions are called key frames. Thereafter, the group for in between drawings executes interpolating for in between actions. Those in between drawings are called interpolations.

The principal for generating the current 3D animation is similar with that of the conventional 2D animation, especially with regarding to the aspect of motion adjustment. The motions of a character are adjusted manually in each sequence of animation, or obtained through an expensive motion capture system. Those motion data could not be repeat-used whether adjusted manually or obtained through the motion capture system. Hence, the production cost is increased. It is subsequent to adjustment of motion to perform coloring through a computer. For an animation played for one second, it takes 450 minutes for coloring under single computer computation, then resulting in time consumption and highly cost.

In case of the sentence "Wang-fang picks up a cup", if the animation for "Wang-fang picks up a cup" is produced by the method for the conventional 3D animation production, the animator should adjust motion of Wang-fang in key frames. It is assumed that Wang-fang sit down at that time, Wang-fang needs to stand up, and walk to nearby the cup, then pick up the cup with hand. However, if there is the same action order in next scene, while Wang-fang lays down in a bed in the next scene, the motions in the last scene could not be repeat-used in the next scene. It is required to re-adjust the motion of Wang-fang in the next scene.

All images of the contemporary 3D animation are obtained through computation of computer, and automatically linked together, which does not like the working flow of the conventional 2D animation. It is more economical in time and labor work for the current computer-generated animation than the conventional 2D animation production.

SUMMARY OF THE INVENTION

Accordingly, there is an intention to provide a method for accelerating 3D animation production, utilizing convenience of the contemporary computer-generated animation, to overcome the above drawbacks of the conventional animation production.

It is a primary object of the present invention to provide a method for accelerating 3D animation production, in which utilizing a sentence as an input command, then analyzing grammar of the sentence through a main program. Thereafter, a subprogram finds out default parameters related to the result of the grammar analysis, and accordingly controls a 3D animation character executing appropriate actions or behaviors in response to the sentence.

It is another object of the present invention to provide a method for accelerating 3D animation production, in which sequential actions of a 3D animation character can be adjusted step by step, and the respective action for each step can be freely re-combined, to flexibly make various sequential actions for a 3D animation character. Then the time and cost for animation production are saved.

It is a further object to provide a method for accelerating 3D animation production, in which a user inputs all related data into computer in accordance with a script, then the computer programs can directly control 3D animation characters executing appropriate actions and behaviors to play the script.

According to the above objects, the present invention provides a method for accelerating 3D animation production, the method comprising: inputting a text string command; analyzing grammar of the text string command to find out the subject, the verb and the object or the quantity and object, through a main, program. Then, the main program deliveries order to a subprogram which controlling the subject to execute judgment and treatment of the action and behavior of the subject. After that, the subprogram finds out the default parameters relating to the relative coordinate and relationship between the subject and object, the current state of the subject, the actions and behaviors to be executed by the subject as well as environmental factors and personality of the subject. Finally, the subprogram judges and integrates those default parameters to control the subject executing appropriate actions or behaviors in response to the text string command.

BRIEF DESCRIPTION OF THE DRAWINGS

The aspects and features of the present invention as well as advantages thereof will become apparent from the following detailed description, considered in conjunction with the accompanying drawing figures. It is to be understood, however, that the drawings are designed for the purpose of illustration and not as a definition of the limits of the invention.

DESCRIPTION OF THE EMBODIMENTS

The sorts of default parameters of the present invention will be explained in detail prior to illustrating one embodiment of the present invention.

The sorts of default parameters of the present invention can be classified as four classes:

A. Phrases

Each phrase pertains to one of the following groups: subject, verb, object, quantity, direction and adjective. The subject is further classified as two sorts, actor/actress and prop.

The default parameters for an actor/actress comprise: name, brother, sister, teacher, occupation, classmate, friend, coworker, lover, enemy, educational background, experience, interesting, personality, characteristics, clothes, weapon, representative action, sex, birthday and by name (all above are formatted in text), age, height and weight (all above are formatted in number), blood type, mate, hair color, eye color, skin color, species, father, mother, religion, residence, nationality and a corresponding 3D model file (all above are formatted in text).

The default parameters for a prop comprise: length, width and height (all above are formatted in number), color (formatted in text), shape (formatted in text), hardness (formatted in number), material (formatted in word), weight (formatted in number), function (formatted in text) and a corresponding 3D model file (formatted in text).

The verb is classified as two sorts, motion and facial expression and mouth shape. The facial expression and mouth shape is further classified as facial expression and mouth shape. The default parameters for facial expression comprise: phrase, emotion types including joy, angry, sad and happy, a corresponding mouth shape data file (all above are formatted in text). The default parameters for mouth shape comprise: phrase, corresponding ablaut and a corresponding mouth shape data file (all above are formatted in text).

The motion is further classified as three sorts: body movement, controlled action and posture. The default parameters of a motion comprise: phrase, intransitive/or transitive (Boolean), sort and motion data file (all above are formatted in text).

B. 3D model

The default parameters for a 3D model comprise: name, explanation and a corresponding 3D model file (all above are formatted in text).

C. Motion data

The default parameters for a motion data comprise: name (formatted in text) and motion data (BLOB).

D. The camera controlling command

The default parameters for the camera controlling command comprise movement way, the major role being shot (all above are formatted in text) and FOV (field of view) (formatted in number).

The default parameters required for the method for accelerating 3D animation production of the present invention depend on the script to be played.

Figure 1:
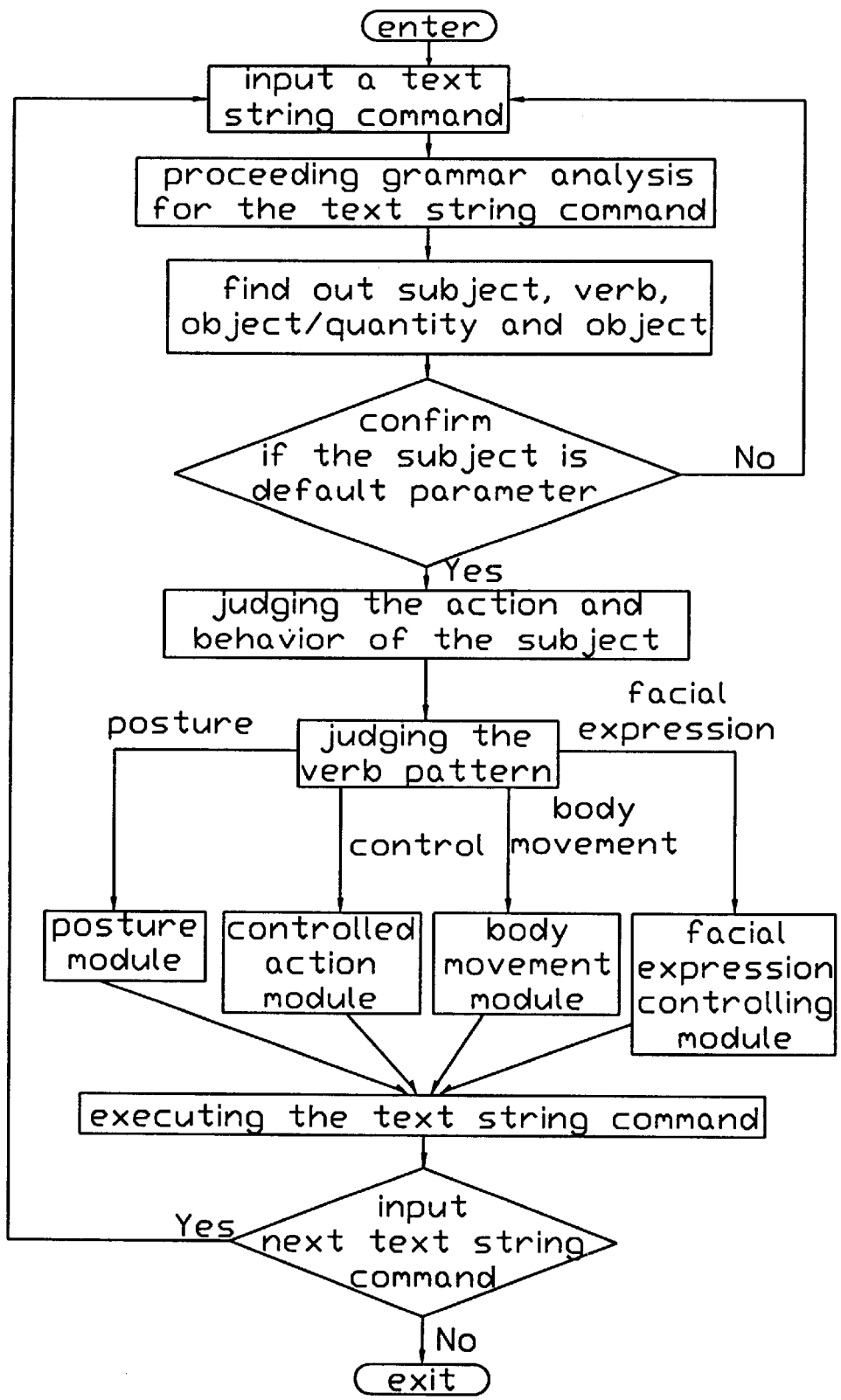
FIG. 1 is a flow chart for execution of the method for accelerating 3D animation production of the present invention.

Referring to FIG. 1, which shows a flow chart of execution of the method for accelerating 3D animation production of the present invention. The software for executing the present 3D animation production includes Max. At initial, inputting a text string command, and grammar of the text string command is analyzed through a main program to find out the subject, the verb as well as the object/or the quantity and object. Then, the main program confirms the subject is a default parameter. Subsequently, the main program delivers an order to a subprogram which controlling the subject to judge and treat actions and behaviors of the subject to confirm the subject could execute the actions or behaviors represented by the verb. Namely, confirming the motion data of the verb is default parameters corresponding to the subject, and judging if the verb is transitive verb. If it is, then judging if the object behind the transitive verb has corresponding default parameters. Afterward, the subprogram finds out the corresponding default parameters for the relative coordinate and relationship between the subject and the object, the current state of the subject, for example, including posture, emotion, health condition etc, and the actions and behaviors of the subject to execute, as well as the default parameters relating to environmental factors as well as personality and characteristic behavior of the subject. The subprogram judges and integrates those default parameters, then controlling a 3D model corresponding to the subject to execute appropriate actions and behaviors in response to the text string command.

Figure 2:
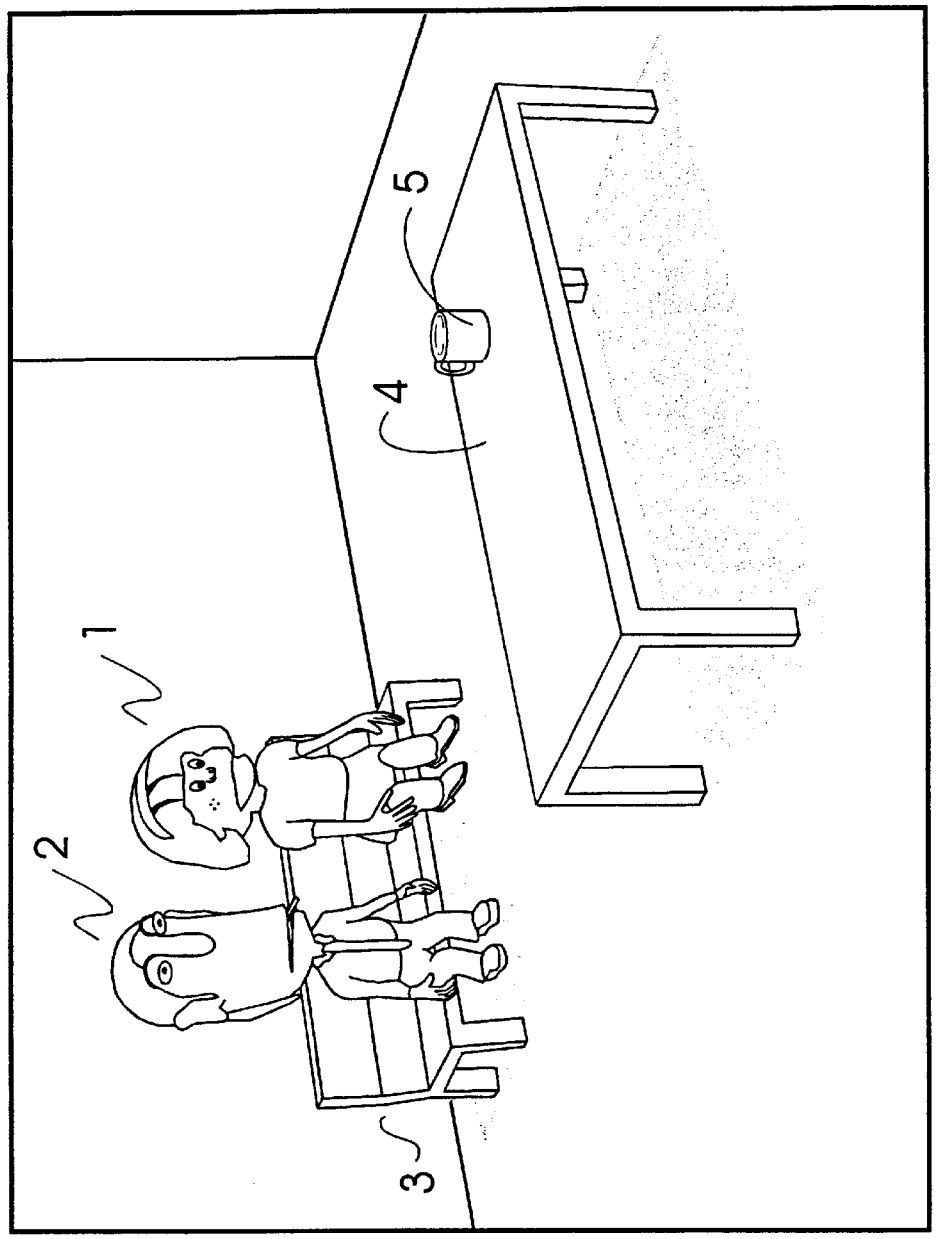
FIGS. 2–4 show respective schematic views of the sequential actions of one embodiment of the present invention.
Figure 3:
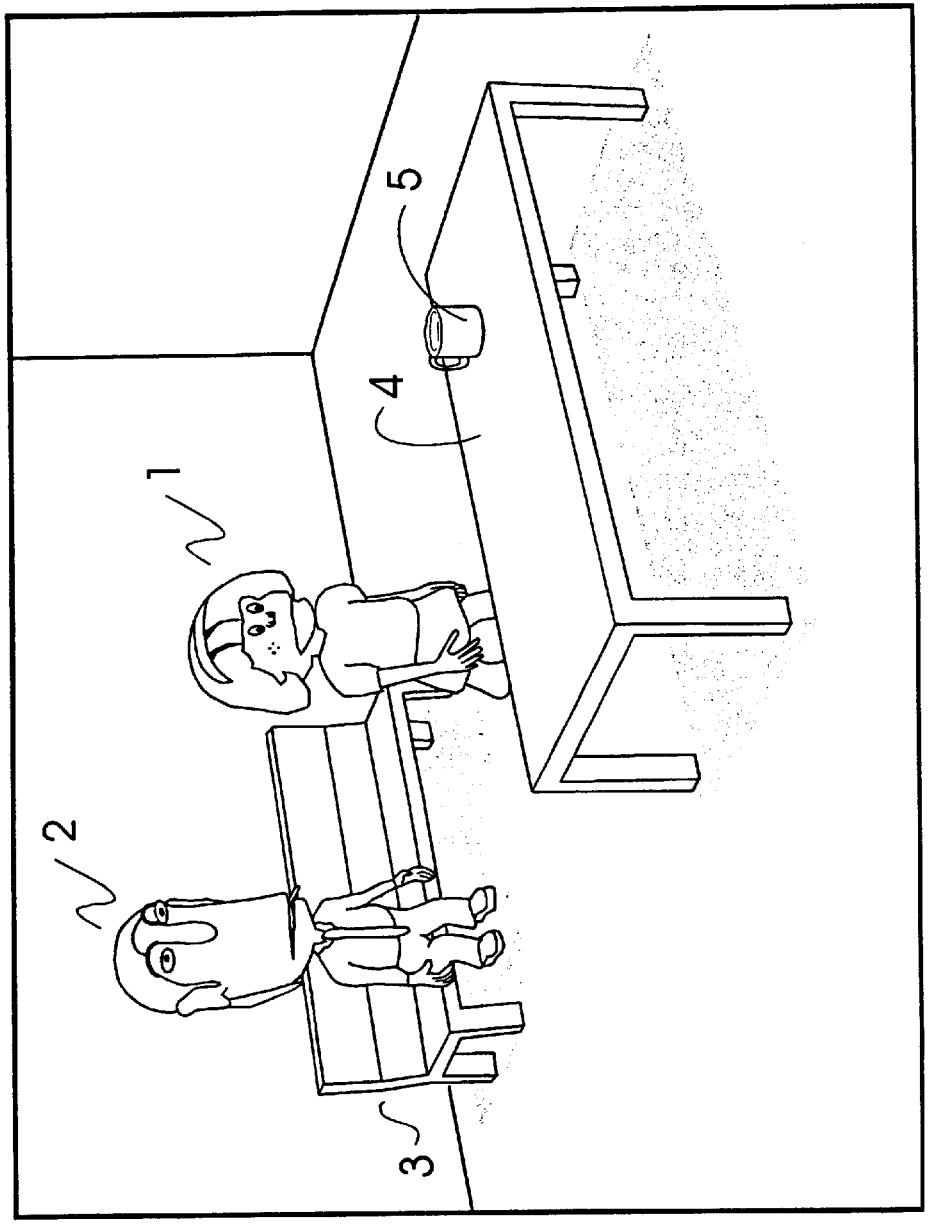
Figure 4:
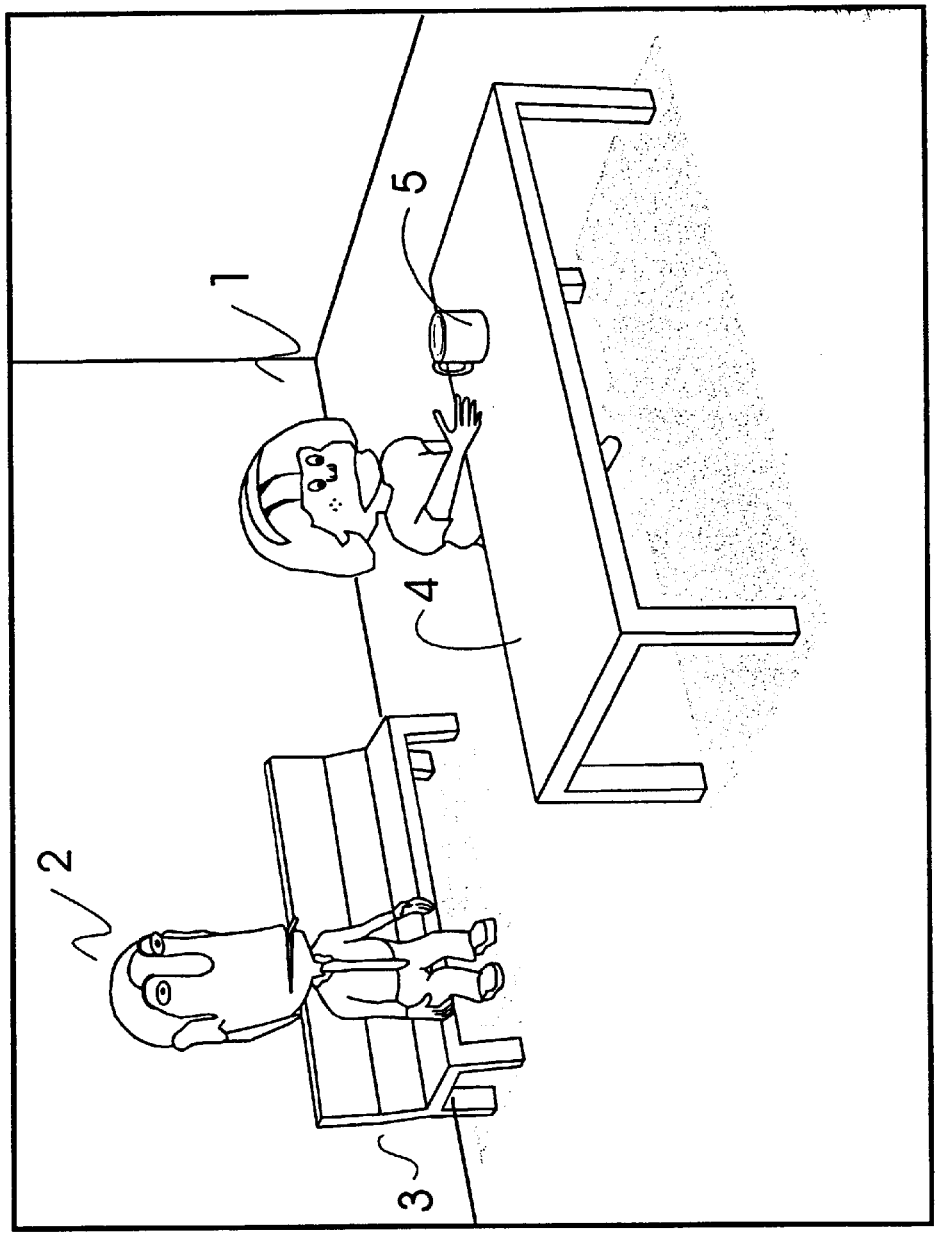

Referring to FIGS. 2~4, which shows 3D animation drawings of the sequential actions for the sentence "Wang-fang picks up a cup", utilizing the present 3D animation production method. In the scene of FIG. 2, there are two characters, one is Wang-fang corresponding to 3D model 1, and the other is Cheng corresponding to 3D model 2. The props include a long strip chair corresponding to 3D model 3, a table corresponding to 3D model 4 and a cup with a handle having water therein corresponding to 3D model 5. For simplification, the numerals 1, 2, 3, 4 and 5 respectively represents Wang-fang, Cheng, the chair, table and cup. In the scene of FIG. 2, Wang-fang 1 and Cheng 2 respectively sit on the chair 3. The table 4 is disposed in front of the chair 3 about 2 meters away. The cup 5 is disposed on the table 4. All of relating data with Wang-fang 1, Cheng 2, the chair 3, table 4 and cup 5 as well as environmental factors of the scene such as barriers on the ground and the surface topography of the ground, are inputted as default parameters. When the main program receives the text string command of "Wang-fang picks up a cup", the main program proceeding grammar analysis of the text string command to find out the subject (Wang-fang), the verb (pick up) as well as the object/or the quantity and object (a cup). Subsequently, the main program delivers an order to a subprogram which controlling Wang-fang 1. The subprogram finds out relating default parameters with regarding to the relative coordinate between Wang-fang 1 and the cup 5, the current state of Wang-fang 1 including a posture, thirsty degree, personality, characteristic behavior such as right-hand or left-hand, verbs to be used for Wang-fang 1 including stand up, walk and pick up, as well as environmental factors. Then, a shortest path without barrier between Wang-fang 1 and the cup 5 is found out through computation according to the above default parameters. Subsequently, selecting appropriate motion module from the motion data corresponding to Wang-fang 1. That is, at first, the subprogram controls the 3D model corresponding Wang-fang 1 changing posture from sit down to stand up, which is according to the result of comparison of the rotation degrees of the joints for the whole body between sit down and stand up of Wang-fang, which saved as default parameters. Thereafter, referring to FIG. 3, Wang-fang 1 walks toward the table 4. Subsequent to Wang-fang 1 attending the table 4, as shown in FIG. 4, the subprogram judges the sort and appearance of the cup 5 and characteristic behavior of Wang-fang 1, for example, the cup 5 with a handle, and Wang-fang 1 is right-hand, the subprogram controls Wang-fang 1 grasp the handle of the cup 5 with right hand. Thereby, in accordance with the method for accelerating 3D animation production of the present invention, such as the sequential motion consisted of the sequence actions of FIGS. 2~4 can be executed by a 3D animation character, only through input of a text string command. By the way, the related data of the posture and coordinate of the subject are update at any time, the programs can obtain those update data at same time.

Furthermore, the movement speed of the subject, for example, Wang-fang, can be either controlled through inputting a text string command, such as "Wang-fang runs across to pick up a cup", or by judgment through computer in accordance with default parameters including the current state of the subject, personality and environmental factors. For example, Wang-fang is sick or gets hurt at that time, the movement speed of Wang-fang would be slow; but if Wang-fang is thirsty and hurries to drink water, or other reasons to take the cup quickly, the movement speed of Wang-fang would be fast. When considering environmental factors, such as there are barriers on the ground and surface topography of the ground is not plain, the movement speed of Wang-fang would be slow. A shortest path without barrier between Wang-fang and the cup is calculated through computer in accordance with the related default parameters. Then appropriate motion module is selected from motion data corresponding Wang-fang.

The factors to be considered for interaction between at least two persons are more than those of actions executed by single person. When a text string command "Tzu-ming kisses Wang-fang" is input, the following corresponding default parameters is required to find out: the relative coordinate between Wang-fang and Tzu-ming and their respective postures at that time to judge if it is necessary to execute body movement for the two persons. In case that the two persons keep a long distance from each other, it is appropriate to execute body movement for the two persons to close to each other, and they stand up and kiss each other. Therefore, the computer needs to calculate the path that Tzu-ming walks toward Wang-fang. During the procedure that Tzu-ming walks toward Wang-fang, they keep watching each other, and subsequently there is motion sequence, such as:

I. Wang-fang extends two arms to welcome Tzu-ming when he closes to her. The computer needs to calculate what time does Wang-fang extend two arms according to how passion between them. If the passion indexes for both of them are high, it is set that Wang-fang extends two arms once upon she seeing Tzu-ming. If the passion indexes for both of them are medium, it is set that Wang-fang extends two arms when Tzu-ming is away from her for two steps.

II. Tzu-ming puts his arms on shoulders of Wang-fang. The computer needs to calculate rotation degree of two arms of Tzu-ming in order that his two arms are put on shoulders of Wang-fang, according to heights of them.

III. Wang-fang holds Tzu-ming. The hands of Wang-fang hold waist of Tzu-ming. The computer needs to calculate distance between waist of Tzu-ming and hands of Wang-fang, and rotation degrees of joints of the hands of Wang-fang.

IV. Wang-fang and Tzu-ming turn their head. If the head of Tzu-ming turns left, then the head of Wang-fang turns right.

V. Tzu-ming kisses Wang-fang. The lips of them frictionally touch each other.

VI. The motion of kiss is ended after a period of time. The period of time is decided depend on personalities of the two persons and relationship between them.

All required default parameters are input previously. When the computer receives the text string command "Tzu-ming kisses Wang-fang", the computer automatically judges those default parameters, and controls corresponding 3D models executing appropriate actions and behaviors in response to the text string.

In view of the foregoing, in accordance with the method for accelerating 3D animation production of the present invention, it is practicable that inputting a text string command, such as a sentence; analyzing grammar of the sentence through a main program to find out the subject, the verb and the object/or the quantity and object; afterward, the main program delivers an order to a subprogram which controlling the subject, to select out appropriate default parameters corresponding the motion module of the subject to be executed and default parameters including environmental factors and personality of the subject. The subprogram judges and integrates those default parameters to control the corresponding 3D model executing appropriated actions and behaviors in response to the text string command of the sentence. The sequential actions of 3D animation characters could be adjusted step by step, and it is able to recombine each action after re-adjusted, as well as all actions could be repeat-used for the present 3D animation production method. Therefore, the time for adjusting motions of 3D animation characters and the cost for 3D animation production are significantly reduced. Furthermore, a user could play an animation film for a script when all related data input as default parameters according to the script.

The above embodiments are only used to illustrate the present invention, not intended to limit the scope thereof. Many modifications of the above embodiments can be made without departing from the spirit of the present invention.

What is claimed is:

1. A method for accelerating 3D animation production, said method comprising:

input a text string command;

analyzing grammar of said text string command through a main program to find out subject, verb, object or quantity, and object in said text string;

delivering an order to a subprogram controlling said subject from said main program;

judging action and behavior of said subject and finding out corresponding default parameters, including relative coordinate and relationship between said subject and said object, the current state of said subject, action and behavior to be executed by said subject, environmental factors, and personality of said subject, through said subprogram; and judging and integrating said default parameters, and controlling said subject executing appropriate motion module in response to said text string, through said subprogram.

2. The method according to claim 1, wherein said default parameters further comprising phrases in Chinese or in English, 3D models, motion data and camera controlling command.

3. The method according to claim 1, wherein said text string command further comprising a sentence.

4. The method according to claim 2, wherein said phrases in Chinese further comprising subject, verb, object, quantity, direction and adjective.

5. The method according to claim 4, wherein said subject further comprising actor/actress and prop.

6. The method according to claim 5, wherein default parameters of said actor/actress further comprising name, brother, sister, teacher, occupation, classmate, friend, coworker, lover, enemy, educational background, experience, interesting, personality, characteristics, clothes, weapon, representative action, sex, birthday and by name all of which being formatted in text, age, height and weight all of which being formatted in number, blood type, mate, hair color, eye color, skin color, species, father, mother, religion, residence, nationality and a corresponding 3D model file all of which being formatted in text.

7. The method according to claim 5, wherein default parameters of said prop further comprising length, width and height all of which being formatted in number, color formatted in text, shape formatted in word, hardness formatted in number, material formatted in text, weight formatted in number, function formatted in word and a corresponding 3D model file formatted in text.

8. The method according to claim 4, wherein said verb further comprising motion and facial expression and mouth shape.

9. The method according to claim 8, wherein default parameters of said facial expression further comprising phrase, emotion type including joy, angry, sad and happy, and corresponding mouth type, all of which being formatted in text.

10. The method according to claim 8, wherein default parameters of said mouth type further comprising phrase, corresponding ablaut and corresponding mouth type date file, all of which being formatted in text.

11. The method according to claim 8, wherein said motion further comprising body movement, controlled action and posture.

12. The method according to claim 11, wherein default parameters of said motion further comprising phrase, intransitive/or transitive (Boolean), sort and motion data file, all of which being formatted in text.

13. The method according to claim 12, wherein default parameters of said motion data file further comprising name being formatted in text and motion data (BLOB).

14. The method according to claim 2, wherein default parameters of said 3D model further comprising name, explanation and a corresponding 3D model file, all of which being formatted in text.

15. The method according to claim 2, wherein default parameters of said camera controlling command further comprising movement type and the major role to be shot, both of which being formatted in text, and field of view (FOV), formatted in number.

16. The method according to claim 11, wherein motions of said motion data is combinable to a motion module.

17. The method according to claim 1, wherein speed of a verb corresponding to said subject is controlled through a command.

18. The method according to claim 1, wherein the appropriate action and behavior of said subject in response to said text string command further comprising a sequence of motions consisted of a motion module.

19. A use for 3D animation production method, which is according to claim 1, wherein said use is applied to play a script.

20. The use according to claim 19, wherein default parameters of the script is dependent on the content of the script.

* * * * *